United States Patent
Matsuda et al.

(10) Patent No.: US 9,999,903 B2
(45) Date of Patent: Jun. 19, 2018

(54) METHOD FOR FORMING CNT (CARBON NANOTUBE) FILM

(71) Applicant: Fuji Chemical CO., LTD., Osaka-shi, Osaka (JP)

(72) Inventors: Takafumi Matsuda, Nakatsugawa (JP); Motoo Sunaga, Nakatsugawa (JP); Hiroshi Isobe, Nakatsugawa (JP); Katsumi Kaneko, Nagano (JP)

(73) Assignee: Fuji Chemical CO., LTD., Osaka (JP)

( * ) Notice: Subject to any disclaimer, the term of this patent is extended or adjusted under 35 U.S.C. 154(b) by 0 days. days.

(21) Appl. No.: 14/378,919

(22) PCT Filed: Feb. 14, 2013

(86) PCT No.: PCT/JP2013/053540
§ 371 (c)(1),
(2) Date: Aug. 14, 2014

(87) PCT Pub. No.: WO2013/122147
PCT Pub. Date: Aug. 22, 2013

(65) Prior Publication Data
US 2015/0174611 A1    Jun. 25, 2015

(30) Foreign Application Priority Data

Feb. 14, 2012  (JP) .................. 2012-029687

(51) Int. Cl.
*B05D 3/10* (2006.01)
*G02F 1/1333* (2006.01)
*B82Y 30/00* (2011.01)
*B82Y 40/00* (2011.01)
*H01B 1/18* (2006.01)
*C01B 32/174* (2017.01)

(52) U.S. Cl.
CPC .............. *B05D 3/107* (2013.01); *B82Y 30/00* (2013.01); *B82Y 40/00* (2013.01); *C01B 32/174* (2017.08); *H01B 1/18* (2013.01)

(58) Field of Classification Search
CPC ..... B05D 3/107; B82Y 40/00; C01B 31/0273; G02F 1/1333
See application file for complete search history.

(56) References Cited

U.S. PATENT DOCUMENTS

2008/0171193 A1* 7/2008 Yi et al. .................. 428/327

FOREIGN PATENT DOCUMENTS

JP   2003300715 A   10/2003
JP   2003303539 A   10/2003
(Continued)

OTHER PUBLICATIONS

International Search Report dated Mar. 14, 2013 for corresponding International Application No. PCT/JP2013/053540, filed Feb. 14, 2013.
(Continued)

*Primary Examiner* — Robert S Walters, Jr.
*Assistant Examiner* — Kristen A Dagenais
(74) *Attorney, Agent, or Firm* — Westman, Champlin & Koehler, P.A.; Z. Peter Sawicki; David D. Brush

(57) ABSTRACT

There is disclosed a method for forming a CNT film. In the method, the CNT film is formed by applying a dispersion liquid including CNT and a silica colloid onto a base material and drying the dispersion liquid.

2 Claims, 1 Drawing Sheet

(56) References Cited

FOREIGN PATENT DOCUMENTS

| JP | 2008037919 A | 2/2008 |
|---|---|---|
| JP | 2008177165 A | 7/2008 |
| JP | 2010013312 A | 1/2010 |

OTHER PUBLICATIONS

Dong Kee Yi, Ordered Array of Linear and Spherical Nanomaterials in a Film Formation via Self Assembly, Journal of Nanoscience and Nanotechnology, 2010, vol. 10, 4690-4695.

V. Datsyuk et al., "Chemical Oxidation of Multiwalled Carbon Nanotubes" Carbon 46 (2008), pp. 833-840.

International Preliminary Report on Patentability and English translation of the Written Opinion dated Aug. 19, 2014 for corresponding International Application No. PCT/JP2013/053540, filed Feb. 14, 2013.

English translation of the Chinese Office Action dated Jan. 25, 2016 for corresponding Chinese Application No. 201380008982.2.

Japanese Office Action and its English translation dated Nov. 17, 2015 for Japanese Application No. 2012-029687 filed Feb. 14, 2012.

English translation of the Notification of the First Office Action dated Jun. 30, 2015 for corresponding Chinese Patent Application No. 201380008982.2.

English translation of the Office Action from the Statement Intellectual Property Office of People's Republic of China, dated Apr. 26, 2016 for corresponding Chinese Application No. 201380008982.2.

English translation of the Office Action from the Statement Intellectual Property Office of People's Republic of China, dated Sep. 21, 2016 for corresponding Chinese Application No. 201380008982.2.

Appeal Decision for corresponding Chinese application No. 201380008982.2 dated Nov. 30, 2017.

English translation of Notification of Reexamination for corresponding Chinese Patent Application No. 201380008982.2, dated Jun. 26, 2017.

\* cited by examiner

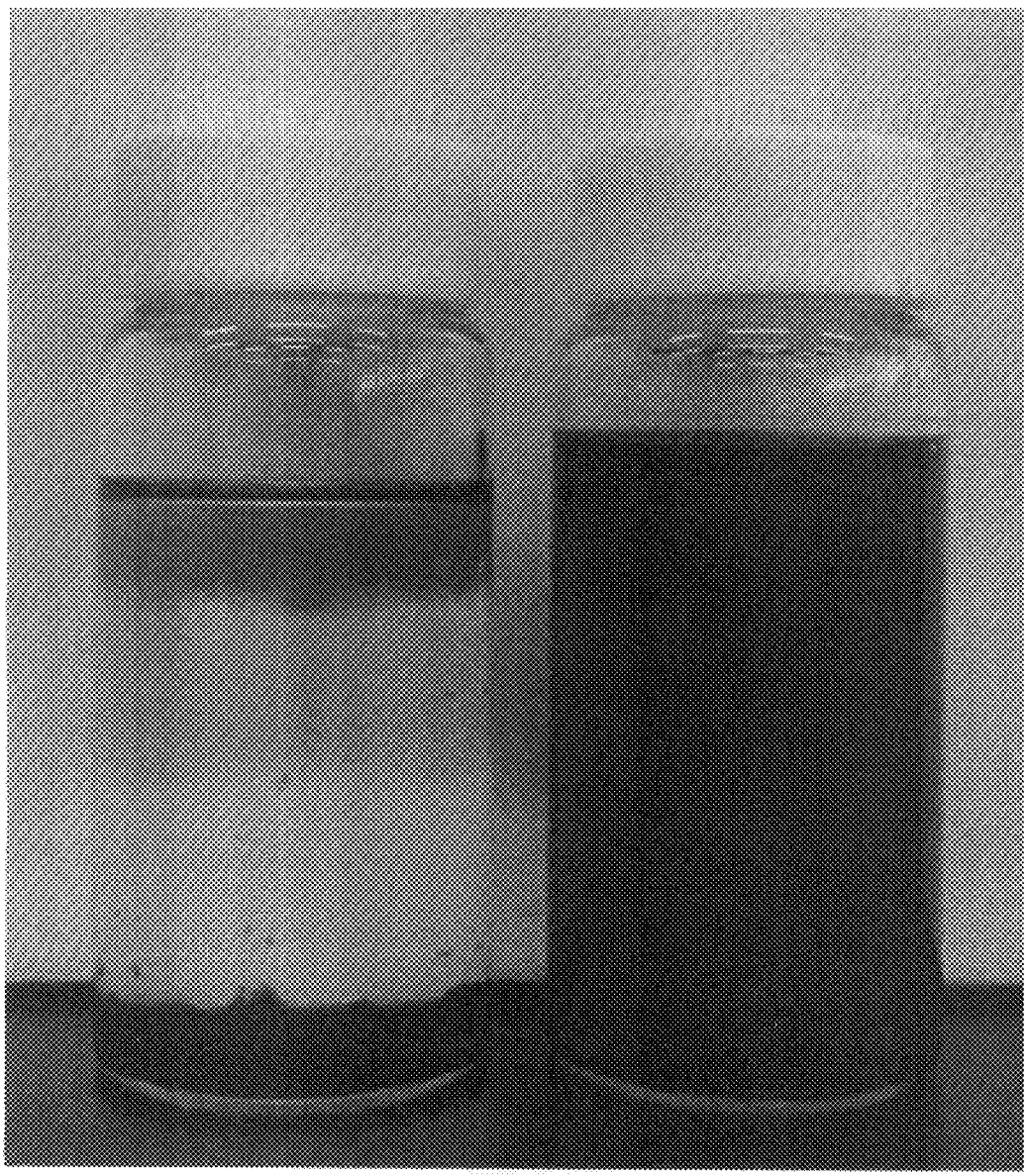

METHOD FOR FORMING CNT (CARBON NANOTUBE) FILM

CROSS-REFERENCE TO RELATED APPLICATIONS

This Application is a 371 National Stage Application of and claims priority of International Application No. PCT/JP2013/053540, filed Feb. 14, 2013, and published as WO 2013/122147 A1 on Aug. 22, 2013, not in English, which claims the benefit of Japanese Patent Application No. 2012-29687 filed Feb. 14, 2012, in the Japan Patent Office, and the entire contents of PCT/JP2013/053540 and of Japanese Patent Application No. 2012-29687 are incorporated herein by reference.

TECHNICAL FIELD

The present invention relates to a method for forming a CNT film.

BACKGROUND ART

Currently, the market for liquid-crystal displays and plasma displays has been growing, and accordingly, demand for transparent conductive films that are essential for such displays has been increasing. The transparent conductive films are applied to, other than such displays, touch panels, solar cells, antistatic materials, electromagnetic shielding materials, sheet heating elements, and so on. Indium Tin Oxide (ITO) is widely applied as the transparent conductive film. However, since Indium is expensive and exhaustion of resources is a concern, there have been examined transparent conductive films that can substitute for the ITO. The transparent conductive films that can substitute for the ITO include, as candidates, carbon nanotube (hereinafter, referred to as CNT) films, zinc oxide (hereinafter, referred to as ZnO), and so on. The CNT especially has a feature that the CNT is applicable to a flexible film, to which the ITO and the ZnO are difficult to be applied.

The CNT film can be obtained by applying a dispersion liquid, in which the CNT is dispersed, onto a base material and drying the same liquid, by using a dip coating method, a spin coating method, a spray coating method, and the like. In order to obtain a CNT film having excellent properties by using such methods, it is necessary to prepare a dispersion liquid, in which the CNT is stably dispersed.

As a method for dispersing the CNT into a dispersion medium, there have been suggested a method in which the CNT is treated by acid (Non-Patent Document 1), a method in which the CNT is treated by plasma (Patent Document 1), a method in which a surface acting agent is added (Patent Document 2), or the like.

PRIOR ART DOCUMENTS

Patent Documents

Patent Document 1: Japanese Unexamined Patent Application Publication No. 2003-300715
Patent Document 2: Japanese Unexamined Patent Application Publication No. 2010-13312

Non-Patent Document

Non-Patent Document 1: V. Datsyuk et al. "Chemical oxidation of multiwalled carbon nanotubes" Carbon 46 (2008), p 833-840

SUMMARY OF THE INVENTION

Problems to be Solved by the Invention

However, a defect is generated on the surface of the CNT or the CNT itself is cut if the surface of the CNT is treated by acid or plasma, whereby the excellent properties (an electric conducting property, a thermal conductivity, a mechanical strength, etc.), which the CNT originally has, are deteriorated. Further, if the CNT film is formed from the dispersion liquid to which the surface acting agent is added, the surface acting agent that is difficult to be removed remains in the CNT film, whereby a conductive property of the CNT film is deteriorated.

An aspect of the present invention is to provide, for forming a CNT film, a method in which a CNT film having excellent properties can be formed.

Means for Solving the Problems

A method of the present invention for forming a CNT film includes forming the CNT film by applying a dispersion liquid having CNT and silica colloid onto a base material and drying the same liquid.

According to the method of the present invention for forming the CNT film, a defect is not generated on a surface of the CNT or the CNT itself is not cut because it is not necessary to treat the surface of the CNT with acid or plasma. Consequently, the CNT film having excellent properties (an electric conducting property, a thermal conductivity, a mechanical strength, etc.) can be formed. Further, since it is not necessary to add a surface acting agent into a dispersion liquid of the CNT, the surface acting agent that is difficult to be removed does not remain in the CNT film. Consequently, the CNT film having excellent properties (the electric conducting property, the thermal conductivity, the mechanical strength, etc.) can be formed.

In the method of the present invention for forming the CNT film, it is preferable to remove the silica colloid from the CNT film by using alkali water solution or a hydrofluoric acid. In this case, the properties of the CNT film are more improved. A respective concentration of the alkali water solution and the hydrofluoric acid can be appropriately adjusted. For example, such concentration can be adjusted within a range from 0.1 to 1.0 mol/l. A method for removing the silica colloid from the CNT film by using the alkali water solution or the hydrofluoric acid includes, for example, a method in which the CNT film is soaked in the alkali water solution or the hydrofluoric acid. In such method, soaking time can be appropriately adjusted. For example, such time can be adjusted within a range from one to thirty minutes.

The alkali water solution should not be limited to a specific kind of solution and can be any solutions by which the silica colloid can be removed, such as, for example, sodium hydroxide solution, potassium hydroxide solution and the like.

A concentration of the silica colloid contained in the dispersion liquid is preferably adjusted within a range from 0.001 to 5% by weight, and is more favorably adjusted within a range from 0.001 to 0.1% by weight. By being adjusted within such range, the CNT can be stably dispersed in the dispersion liquid. Consequently, the properties (e.g., the electric conducting property) of the CNT film to be formed are more improved.

A concentration of the CNT contained in the dispersion liquid is preferably adjusted within a range from $1\times10^{-5}$ to 5% by weight. By being adjusted within such range, the properties (e.g., the electric conducting property) of the CNT film to be formed are more improved.

A solvent (a dispersion medium) of the dispersion liquid can be appropriately selected. Such solvent includes water, volatile organic solvent (e.g., THF (tetrahydrofuran), ethanol, and the like) or mixture of the above. The surface acting agent or other addition agents can be blended into the dispersion liquid within a range in which the properties of the CNT film are not significantly deteriorated.

The base material should not be limited to a specific kind of material. For example, a base material made of a glass, a resin (e.g., PET), or the like can be used.

The method for applying the dispersion liquid should not be limited to a specific method. For example, a dip coating method, a spin coating method, a spray coating method, or the like can be used. The base material can be heated while the CNT film is formed.

BRIEF DESCRIPTION OF THE DRAWINGS

FIG. 1 is a picture showing a dispersion property of a dispersion liquid.

MODE FOR CARRYING OUT THE INVENTION

Hereinafter, an embodiment for carrying out the present invention will be described.

1. Preparation of Dispersion Liquid Including CNT and Silica Colloid (1-1) Sodium silicate solution No. 5 ($SiO_2$: 25.5% by weight; mole ratio: 3.7) was diluted by ion-exchange water, such that a concentration of the $SiO_2$ is 5% by weight. After that, silica colloid solution was prepared by using a cation-exchange resin. The silica colloid solution was diluted by mixed solution of the ion-exchange water and THF, whereby there were prepared, respectively, the silica colloid solution having a $SiO_2$ concentration of 0.001% by weight, the silica colloid solution having a $SiO_2$ concentration of 0.005% by weight, the silica colloid solution having a $SiO_2$ concentration of 0.01% by weight, the silica colloid solution having a $SiO_2$ concentration of 0.05% by weight, and the silica colloid solution having a $SiO_2$ concentration of 0.1% by weight.

(1-2) Single-walled CNT (manufactured by Unidym) was added to each of five types of the silica colloid solutions that were prepared in (1-1), and then an ultrasonic treatment was applied to each of the same solutions. Consequently, five types of the dispersion liquid each including the CNT and the silica colloid were prepared. Hereinafter, five types of the prepared dispersion liquid will be referred to as follows.

A dispersion liquid A1: the dispersion liquid prepared by using the silica colloid solution having the $SiO_2$ concentration of 0.001% by weight.

A dispersion liquid A2: the dispersion liquid prepared by using the silica colloid solution having the $SiO_2$ concentration of 0.005% by weight.

A dispersion liquid A3: the dispersion liquid prepared by using the silica colloid solution having the $SiO_2$ concentration of 0.01% by weight.

A dispersion liquid A4: the dispersion liquid prepared by using the silica colloid solution having the $SiO_2$ concentration of 0.05% by weight.

A dispersion liquid A5: the dispersion liquid prepared by using the silica colloid solution having the $SiO_2$ concentration of 0.1% by weight.

Compositions of the dispersion liquid A1 to A5 are indicated as follows.

<The Dispersion Liquid A1>
Single-walled CNT: 0.01% by weight
Silica: 0.001% by weight
Water: 21.939% by weight
THF: 78.05% by weight <The Dispersion Liquid A2>
Single-walled CNT: 0.01% by weight
Silica: 0.005% by weight
Water: 21.935% by weight
THF: 78.05% by weight <The Dispersion Liquid A3>
Single-walled CNT: 0.01% by weight
Silica: 0.01% by weight
Water: 21.930% by weight
THF: 78.05% by weight <The Dispersion Liquid A4>
Single-walled CNT: 0.01% by weight
Silica: 0.05% by weight
Water: 21.89% by weight
THF: 78.05% by weight <The Dispersion Liquid A5>
Single-walled CNT: 0.01% by weight
Silica: 0.11% by weight
Water: 21.83% by weight
THF: 78.05% by weight As shown in a right side picture of FIG. 1, the CNT was stably dispersed and a precipitate was not formed in the dispersion liquid A4 even after the same A4 had been left at rest for a long time. The dispersion liquid A1 to A3 and A5 showed a similar result as the dispersion liquid A4. In contrast, as shown in a left side picture of FIG. 1, a precipitate did result in a short time in the dispersion liquid of the CNT, in which the silica colloid was not included. Therefore, such dispersion liquid of the CNT could not be used to be applied onto the CNT film, which is to be described hereinafter.

2. Formation of CNT Film (2-1) By using the dip coating method, the dispersion liquid (any one of the dispersion liquid A1 to A5) was applied onto a PET film having a thickness of 100 μm, and the same liquid was dried. Applying and drying of the dispersion liquid was repeated predetermined number of times (any one of fifty times, one hundred times, two hundred times, or four hundred times). In the above-described process, the CNT film (before the removal of the silica) was formed.

A resistance value of the CNT film (before the removal of the silica) was measured by using a four-terminal resistivity meter (i.e., "Loresta GP" manufactured by Mitsubishi Chemical Corporation.) Further, a transmissivity of the CNT film (before the removal of the silica) was measured by using a spectrophotometer (i.e., "V-670" manufactured by JASCO Corporation.) The results of such measurements will be indicated in Table 1.

TABLE 1

| Applying and Drying | Dispersion Liquid | | | |
|---|---|---|---|---|
| (number of times) | A2 | A3 | A4 | A5 |
| 50 | >$10^8$ | $5.7 \times 10^7$ | >$10^8$ | >$10^8$ |
|  | 87.3 | 87.7 | 85.1 | 90 |
| 100 | >$10^8$ | $1.1 \times 10^6$ | $6.0 \times 10^7$ | >$10^8$ |
|  | 85.6 | 75.5 | 73.7 | 71 |
| 200 | $8.0 \times 10^6$ | $2.5 \times 10^4$ | $2.2 \times 10^6$ | $8.0 \times 10^6$ |
|  | 83.2 | 56.6 | 48.8 | 49.7 |
| 400 | $3.6 \times 10^4$ | $2.2 \times 10^3$ | $1.7 \times 10^4$ | $1.4 \times 10^5$ |
|  | 50.2 | 24.1 | 25 | 29.2 |

In each column of Table 1, an upper numerical value shows the resistance value (Ω) and a lower numerical value shows the transmissivity (%).

(2-2) Among the CNT films (before the removal of the silica) that were formed in (2-1), a removing process of the silica colloid was implemented on the CNT film (before the removal of the silica) on which the dispersion liquid A4 used as the dispersion liquid were applied and dried two hundred times. Consequently, the CNT film (after the removal of the silica) was formed.

As the removing process of the silica colloid, implemented was either one of three types of processes to be described as follows. A first process was a process in which the silica colloid was removed by soaking the CNT film (before the removal of the silica) into a sodium hydroxide solution, whose concentration was 1 mol/l, for thirty minutes. A second process was a process in which the silica colloid was removed by soaking the CNT film (before the removal of the silica) into a potassium hydroxide solution, whose concentration was 1 mol/l, for thirty minutes. A third process was a process in which the silica colloid was removed by soaking the CNT film (before the removal of the silica) into a hydrofluoric acid, whose concentration was 1 mol/l, for thirty minutes.

A resistance value (Ω) of the CNT film (after the removal of the silica) was measured by using the four-terminal resistivity meter (Loresta GP manufactured by Mitsubishi Chemical Corporation). The result of this measurement will be indicated in Table 2. In addition, in Table 2, the resistance value (Ω) of the CNT film, on which the removing process of the silica colloid has not yet been implemented, will be also indicated.

TABLE 2

| Before implementing the removing process | NaOH After implementing the removing process for thirty minutes | KOH After implementing the removing process for thirty minutes | HF After implementing the removing process for thirty minutes |
| --- | --- | --- | --- |
| $1.4 \times 10^5$ | $2.2 \times 10^4$ | $3.4 \times 10^4$ | $1.8 \times 10^4$ |

(2-3) A removing process of the silica colloid was implemented on the CNT films (before the removal of the silica) that were formed in (2-1). Consequently, the CNT film (after the removal of the silica) was formed. The removing process of the silica colloid was a process in which the CNT film was soaked into the sodium hydroxide solution for a predetermined time. In Table 3, there will be shown combinations of types of the CNT films (before the removal of the silica), (i.e., types of the dispersion liquid used for forming the CNT film), and conditions of the removing process of the silica colloid (concentrations of the sodium hydroxide solution and soaking time). The number of each of applying and drying the dispersion liquid in the formation of the CNT film was two hundred times.

TABLE 3

| | | Resistance Value (Ω) | |
| --- | --- | --- | --- |
| Dispersion Liquid | Conditions for the removal of Silica | Before the removal of Silica | After the removal of Silica |
| A2 | 1 mol/l 30 min | $8.0 \times 10^6$ | $1.7 \times 10^6$ |
| A3 | 1 mol/l 30 min | $3.8 \times 10^4$ | $1.2 \times 10^4$ |

TABLE 3-continued

| | | Resistance Value (Ω) | |
| --- | --- | --- | --- |
| Dispersion Liquid | Conditions for the removal of Silica | Before the removal of Silica | After the removal of Silica |
| A4 | 0.4 mol/l 4 min | $4.8 \times 10^5$ | $1.0 \times 10^5$ |
| | 0.4 mol/l 6 min | $3.6 \times 10^5$ | $3.9 \times 10^4$ |
| | 0.7 mol/l 3 min | $4.1 \times 10^5$ | $9.7 \times 10^4$ |
| | 0.7 mol/l 5 min | $3.3 \times 10^5$ | $2.2 \times 10^4$ |
| | 1 mol/l 0.5 min | $4.8 \times 10^5$ | $1.3 \times 10^5$ |
| | 1 mol/l 1 min | $3.6 \times 10^5$ | $1.5 \times 10^5$ |
| | 1 mol/l 3 min | $2.3 \times 10^5$ | $3.4 \times 10^4$ |
| | 1 mol/l 10 min | $3.0 \times 10^5$ | $4.0 \times 10^4$ |
| | 1 mol/l 30 min | $4.4 \times 10^5$ | $2.8 \times 10^4$ |
| A5 | 1 mol/l 30 min | $2.7 \times 10^6$ | $3.3 \times 10^4$ |
| | 0.1 mol/l 5 min | $3.9 \times 10^6$ | $1.1 \times 10^5$ |
| | 0.1 mol/l 10 min | $3.3 \times 10^6$ | $2.9 \times 10^4$ |
| | 0.1 mol/l 30 min | $3.0 \times 10^6$ | $2.4 \times 10^4$ |

Then, a resistance value of the CNT film (after the removal of the silica) was measured by using the four-terminal resistivity meter (Loresta GP manufactured by Mitsubishi Chemical Corporation). The result of this measurement is indicated in Table 3 as above. In addition, in Table 3, the resistance value of the CNT film, to which the removing process of the silica colloid has not yet been implemented, is also indicated.

If a concentration of the sodium hydroxide solution is "c" (mol/l) and soaking time is "t" (min), the properties of the CNT film are more improved within a range in which Formula 1 is satisfied.

$$C \geq 2.7 \exp(-3.3t)$$ Formula 1:

3. Effect of Method for Forming CNT Films (3-1) According to the above-described method for forming the CNT film, a defect is not generated on a surface of the CNT or the CNT itself is not cut because it is not necessary to treat the surface of the CNT by acid or plasma. Consequently, as shown in Tables 1 to 3 as above, the CNT film having excellent properties (an electric conducting property, a thermal conductivity, a mechanical strength, etc.) can be formed. Further, since it is not necessary to add a surface acting agent into the dispersion liquid of the CNT, the surface acting agent that is difficult to be removed does not remain in the CNT film. Consequently, as shown in Tables 1 to 3 as above, the CNT film having excellent properties (the electric conducting property, the thermal conductivity, the mechanical strength, etc.) can be formed.

(3-2) Since the silica colloid had been removed from the CNT films that were formed in (2-2) and (2-3), the properties of the CNT films are more improved, as shown in Tables 2 and 3.

(3-3) As shown in FIG. 1, the CNT can be stably dispersed in the dispersion liquid A1 to A5. As a result, the CNT film having homogenous properties can be formed.

(3-4) The CNT films that were formed in (2-1), (2-2), and (2-3) have excellent heat resistance, and such CNT films are less likely to be influenced by humidity.

The present invention should not be limited to the aforementioned embodiments, and can be implemented in various manners within a scope not departing from the spirit of the present invention.

For example, the solvents of the dispersion liquid A1 to A5 can be water only (i.e., the THF is not included). In this case, substantially the same effect as the aforementioned embodiment can be achieved.

The CNT film can be formed on a resin film other than a PET film, or on a base material made of glass. In this case, substantially the same effect as the aforementioned embodiment can be achieved.

As a method for applying the dispersion liquid, other application methods (for example, a spray coating method, a spin coating method, and the like) can be used. In this case, substantially the same effect as the aforementioned embodiment can be achieved.

After the silica colloid is removed, the CNT film can be compressed. By compressing the CNT film, the properties thereof are more improved As a process in which the silica colloid is removed, there can be used other processes than the process in which the CNT film is soaked into the alkali water solution or the hydrofluoric acid. For example, the alkali water solution or the hydrofluoric acid can be applied (or sprayed) onto the surface of the CNT film.

The invention claimed is:

1. A method for forming a CNT (Carbon Nanotube) film, comprising:

applying a dispersion liquid including a CNT and a silica colloid and a solvent onto a base material; and drying the dispersion liquid, wherein the CNT film has a thickness after 50 to 400 times applying and drying of the dispersion liquid, wherein the silica colloid is removed from the CNT film by using an alkali water solution or a hydrofluoric acid, wherein a concentration of the silica colloid in the dispersion liquid is within a range from 0.01 to 0.11% by weight, and wherein a concentration of the CNT in the dispersion liquid is within a range from $1 \times 10^{-5}$ to 0.01% by weight.

2. The method for forming the CNT film according to claim 1, wherein the alkali water solution is a sodium hydroxide solution or a potassium hydroxide solution.

* * * * *